(12) United States Patent
Hu et al.

(10) Patent No.: US 10,069,604 B2
(45) Date of Patent: Sep. 4, 2018

(54) DATA TRANSMISSION METHOD AND APPARATUS

(71) Applicant: Huawei Technologies Co., Ltd., Shenzhen (CN)

(72) Inventors: Xing Hu, Beijing (CN); Yu Hu, Beijing (CN); Shuchang Shan, Beijing (CN); Xiaowei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 15/096,393

(22) Filed: Apr. 12, 2016

(65) Prior Publication Data

US 2016/0226633 A1 Aug. 4, 2016

Related U.S. Application Data

(63) Continuation of application No. PCT/CN2014/089206, filed on Oct. 22, 2014.

(30) Foreign Application Priority Data

Oct. 23, 2013 (CN) .......................... 2013 1 0505080

(51) Int. Cl.
*H04L 1/22* (2006.01)
*H04L 12/801* (2013.01)
(Continued)

(52) U.S. Cl.
CPC ............... *H04L 1/22* (2013.01); *H04L 1/0007* (2013.01); *H04L 29/12575* (2013.01);
(Continued)

(58) Field of Classification Search
CPC ......... H04L 1/22; H04L 47/10; H04L 45/245; H04L 69/326; H04L 69/324;
(Continued)

(56) References Cited

U.S. PATENT DOCUMENTS 6,108,713 A * 8/2000 Sambamurthy ......... H04L 29/06
370/463
2004/0221032 A1 11/2004 Bernstein et al.
(Continued)

FOREIGN PATENT DOCUMENTS

| CN | 1774708 A | 5/2006 |
|---|---|---|
| CN | 1952821 A | 4/2007 |

(Continued)

OTHER PUBLICATIONS

Foreign Communication From a Counterpart Application, Chinese Application No. 201310505080.1, Chinese Office Action dated Jul. 4, 2017, 5 pages.
(Continued)

*Primary Examiner* — Kwang B Yao
*Assistant Examiner* — Moo Ryong Jeong
(74) *Attorney, Agent, or Firm* — Conley Rose, P.C.

(57) ABSTRACT

A data transmission method and apparatus, where the method comprises checking full-bandwidth transmission paths of a bus, and When a fault occurs in the full-bandwidth transmission paths and a quantity of faulty full-bandwidth transmission paths is less than or equal to M, selecting N full-bandwidth transmission paths from full-bandwidth transmission paths that are not faulty to transmit a data unit, and when a fault occurs in the full-bandwidth transmission paths and a quantity of faulty full-bandwidth transmission paths is greater than M, reconfiguring a size of a data unit according to a quantity of full-bandwidth transmission paths that are not faulty and a target burst quantity.

10 Claims, 6 Drawing Sheets

(51) Int. Cl.
*H04L 12/709* (2013.01)
*H04L 29/08* (2006.01)
*H04L 29/12* (2006.01)
*H04L 12/703* (2013.01)
*H04L 1/00* (2006.01)

(52) U.S. Cl.
CPC ............ *H04L 45/245* (2013.01); *H04L 45/28* (2013.01); *H04L 47/10* (2013.01); *H04L 69/324* (2013.01); *H04L 69/326* (2013.01); *H04L 2001/0094* (2013.01)

(58) Field of Classification Search
CPC . H04L 29/12575; H04L 45/28; H04L 1/0007; H04L 2001/0094
See application file for complete search history.

(56) References Cited

U.S. PATENT DOCUMENTS

| | | | | |
|---|---|---|---|---|
| 2005/0204193 | A1* | 9/2005 | Mannava | G06F 11/0745 714/18 |
| 2006/0004968 | A1* | 1/2006 | Vogt | G06F 12/0804 711/154 |
| 2006/0168331 | A1 | 7/2006 | Thompson et al. | |
| 2007/0011562 | A1* | 1/2007 | Alexander | G06F 11/1004 714/758 |
| 2007/0213038 | A1* | 9/2007 | Masseroni | H04L 29/06027 455/414.3 |
| 2007/0234082 | A1 | 10/2007 | Hsu | |
| 2010/0083070 | A1 | 4/2010 | Xiang | |
| 2012/0166483 | A1 | 6/2012 | Choudhary et al. | |
| 2017/0109315 | A1* | 4/2017 | Safranek | G06F 13/4291 |

FOREIGN PATENT DOCUMENTS

| | | |
|---|---|---|
| CN | 101133380 A | 2/2008 |
| CN | 101330369 A | 12/2008 |
| EP | 1703402 A1 | 9/2006 |
| EP | 2288069 A1 | 2/2011 |
| WO | 2013063175 A1 | 5/2013 |

OTHER PUBLICATIONS

Foreign Communication From a Counterpart Application, European Application No. 14855244.1, Extended European Search Report dated Jul. 8, 2016, 8 pages.

Foreign Communication From a Counterpart Application, PCT Application No. PCT/CN2014/089206, English Translation of International Search Report dated Jan. 26, 2015, 2 pages.

Foreign Communication From a Counterpart Application, PCT Application No. PCT/CN2014/089206, English Translation of Written Opinion dated Jan. 26, 2015, 5 pages.

* cited by examiner

DATA TRANSMISSION METHOD AND APPARATUS

CROSS-REFERENCE TO RELATED APPLICATIONS

This application is a continuation of International Application No. PCT/CN2014/089206, filed on Oct. 22, 2014, which claims priority to Chinese Patent Application No. 201310505080.1, filed on Oct. 23, 2013, both of which are hereby incorporated by reference in their entireties.

TECHNICAL FIELD

The present disclosure relates to the communications field, and in particular, to a data transmission method and apparatus.

BACKGROUND

A bus is a public path for transmitting information between function components of a computer and is a transmission bundle that includes a conducting wire. Based on the category of information transmitted by the computer, buses of the computer may be classified into a data bus, an address bus, and a control bus, which are respectively used to transmit data, data addresses, and control signals. A bus is an internal structure and is a public path for the central processing unit (CPU), memory, input device, and output device to transfer information. Various components of a host are connected by the bus, and an external device is further connected to the bus using a corresponding interface circuit, thereby forming a computer hardware system.

The bandwidth size of a bus affects system service quality, and a decrease of the bus bandwidth may cause degradation of performance of a system. Because the bus is a connecting path of components of a host, once a physical fault (a breakpoint) occurs, catastrophic breakdown may occur in the system. To avoid occurrence of such an incident, reliability design is needed on the bus.

A hyper transport (HT) bus technology is a point-to-point connection technology which distinguishes four layers, namely, physical layer, data link layer, protocol layer, and transaction layer. Reliability design of the HT bus technology is mainly adding a data link layer cyclic redundancy check (CRC) code and performing data link layer check. A quantity of paths in the HT bus technology may have the following several choices, 32, 16, 8, 4, and 2. When a hard fault occurs in a bus path, correct running of a system may be achieved by manually setting bandwidth. This method needs human diagnosis and intervention, and does not have a function of automated diagnosis and processing. Then, although adjusting bandwidth may make a device run normally, a data transmission path cannot be dynamically selected in the method. If the hard fault occurs in a data transmission path that is being used, the system still cannot run correctly.

A bus self-healing technology is proposed in the prior art, where a physical path can be dynamically configured without the need of human intervention such that full bandwidth of a physical line decreases to ½ of the original in order to solve the problem that a physical fault occurs in a bus path.

In actual application of data transmission, because it is necessary to ensure that a data volume of a message unit at the data link layer is an integer multiple of a quantity of data transmission paths, when a fault occurs in a single path of a bus, if such a bus self-healing technology is used, the work of data transmission path modification will increase by multiples such that bandwidth at least decreases to half of the original, which severely affects system performance and wastes a large number of available paths.

SUMMARY

Embodiments of the present disclosure provide a data transmission method, which is used to, when a full-bandwidth transmission path is faulty, adaptively adjust a data unit transmission manner according to a condition of full-bandwidth transmission paths.

A data transmission method provided in a first aspect of an embodiment of the present disclosure includes detecting full-bandwidth transmission paths of a bus, where the full-bandwidth transmission paths include N data transmission paths and M redundancy check paths. The data transmission paths are used to transmit a data unit, and the redundancy check paths are used to perform data link layer check for transmission of the data unit. N and M are both natural numbers greater than 0, and the data unit is a data block that has a specific data volume, and selecting N full-bandwidth transmission paths from full-bandwidth transmission paths that are not faulty to transmit the data unit, if a fault occurs in the full-bandwidth transmission paths and a quantity of faulty full-bandwidth transmission paths is less than or equal to M, or if a fault occurs in the full-bandwidth transmission paths and a quantity of faulty full-bandwidth transmission paths is greater than M, reconfiguring a size of the data unit according to a quantity of full-bandwidth transmission paths that are not faulty and a target burst quantity such that the data volume of the data unit is an integer multiple of the quantity of full-bandwidth transmission paths that are not faulty, where the target burst quantity is a quantity of transmission times over the full-bandwidth transmission paths for completing transmission of one data unit.

In a first possible implementation manner of the first aspect, before the selecting N full-bandwidth transmission paths from full-bandwidth transmission paths that are not faulty to transmit the data unit, if a fault occurs in the full-bandwidth transmission paths and a quantity of faulty full-bandwidth transmission paths is less than or equal to M, the method includes disabling a data link layer check function of the redundancy check paths, and setting a transport layer check function for data unit transmission.

With reference to the first possible implementation manner of the first aspect, in a second possible implementation manner of the first aspect, the setting a transport layer check function for data unit transmission includes encapsulating the data unit, adding a sequence number to a packet of the data unit, and adding a CRC code flag to the packet of the data unit, and when the quantity of faulty full-bandwidth transmission paths is less than or equal to M, setting the CRC code flag to enable.

In a third possible implementation manner of the first aspect, before the selecting N full-bandwidth transmission paths from full-bandwidth transmission paths that are not faulty to transmit the data unit, if a fault occurs in the full-bandwidth transmission paths and a quantity of faulty full-bandwidth transmission paths is less than M, the method includes changing an original 12-bit CRC (CRC12) code to an 8-bit CRC code (CRC8), and performing data link layer check in K full-bandwidth transmission paths that are not faulty using the CRC8 code, where the K full-bandwidth transmission paths that are not faulty are full-bandwidth transmission paths that are not faulty and left after the N full-bandwidth transmission paths are selected, and K is an integer greater than 0.

In a fourth possible implementation manner of the first aspect, the reconfiguring the data volume of the data unit according to a quantity of full-bandwidth transmission paths that are not faulty and a target burst quantity such that the data volume of the data unit is an integer multiple of the quantity of full-bandwidth transmission paths that are not faulty further includes reconfiguring a total data volume of a single data unit, and acquiring the target burst quantity for transmission of the reconfigured data unit, where the target burst quantity is a sum of a data burst quantity and a check code burst quantity, the check code burst quantity is a quantity of transmission times over the full-bandwidth transmission paths for completing transmission of a check code corresponding to one data unit, and the data burst quantity is a quantity of transmission times over the full-bandwidth transmission paths for completing transmission of data corresponding to one data unit, and multiplying the target burst quantity and the quantity of full-bandwidth transmission paths that are not faulty to obtain the reconfigured total data volume of the data unit, where one bit of the data volume of the data unit is transmitted over one of the full-bandwidth transmission paths each time.

With reference to the fourth possible implementation manner of the first aspect, in a fifth possible implementation manner of the first aspect, the acquiring the target burst quantity for transmission of the data unit is further includes rounding up a quotient obtained by dividing a data volume of a check code by the quantity of full-bandwidth transmission paths that are not faulty, and multiplying a result obtained by rounding up the quotient by a base burst quantity in order to obtain the target burst quantity, where the base burst quantity is set according to a design standard of the bus.

A data transmission apparatus provided in a second aspect of an embodiment of the present disclosure includes a detecting unit, a configuring unit, a first transmission unit, and a second transmission unit, where the checking unit is configured to check full-bandwidth transmission paths of a bus, where the full-bandwidth transmission paths include N data transmission paths and M redundancy check paths. The data transmission paths are used to transmit a data unit, and the redundancy check paths are used to perform data link layer check for transmission of the data unit. N and M are both natural numbers greater than 0, and the data unit is a data block that has a specific data volume, and trigger the first transmission unit if a fault occurs in the full-bandwidth transmission paths and a quantity of faulty full-bandwidth transmission paths is less than or equal to M, or trigger the configuring unit if a fault occurs in the full-bandwidth transmission paths and a quantity of faulty full-bandwidth transmission paths is greater than M. The first transmission unit is configured to select N full-bandwidth transmission paths from full-bandwidth transmission paths that are not faulty to transmit the data unit. The configuring unit reconfigures a size of the data unit according to a quantity of full-bandwidth transmission paths that are not faulty and a target burst quantity such that the data volume of the data unit is an integer multiple of the quantity of full-bandwidth transmission paths that are not faulty, where the target burst quantity is a quantity of transmission times over the full-bandwidth transmission paths for completing transmission of one data unit, and after reconfiguration of the data unit is completed, triggers the second transmission unit, and the second transmission unit is configured to transmit the reconfigured data unit over the full-bandwidth transmission paths that are not faulty.

In a first possible implementation manner of the second aspect, the first transmission unit is further configured to, if a fault occurs in the full-bandwidth transmission paths and a quantity of faulty full-bandwidth transmission paths is less than or equal to M, before the selecting N full-bandwidth transmission paths from full-bandwidth transmission paths that are not faulty to transmit the data unit, disable a data link layer check function of the redundancy check paths, and set a transport layer check function for data unit transmission.

With reference to the first possible implementation manner of the second aspect, in a second possible implementation manner of the second aspect, the data transmission apparatus further includes, a data encapsulating unit configured to encapsulate the data unit, add a sequence number to a packet of the data unit, and add a CRC code flag to the packet of the data unit, and when the quantity of faulty full-bandwidth transmission paths is less than or equal to M, set the CRC code flag to enable.

In a third possible implementation manner of the second aspect, the first transmission unit is further configured to, if a fault occurs in the full-bandwidth transmission paths and a quantity of faulty full-bandwidth transmission paths is less than M, before the selecting N full-bandwidth transmission paths from full-bandwidth transmission paths that are not faulty to transmit the data unit, change an original CRC12 code to a CRC8 code, and perform data link layer check in K full-bandwidth transmission paths that are not faulty using the CRC8 code, where the K full-bandwidth transmission paths that are not faulty are full-bandwidth transmission paths that are not faulty and left after the N full-bandwidth transmission paths are selected, and K is an integer greater than 0.

In a fourth possible implementation manner of the second aspect, the configuring unit is configured to reconfigure a total data volume of a single data unit, and acquire the target burst quantity for transmission of the reconfigured data unit, where the target burst quantity is a sum of a data burst quantity and a check code burst quantity, the check code burst quantity is a quantity of transmission times over the full-bandwidth transmission paths for completing transmission of a check code corresponding to one data unit, and the data burst quantity is a quantity of transmission times over the full-bandwidth transmission paths for completing transmission of data corresponding to one data unit, and multiply the target burst quantity and the quantity of full-bandwidth transmission paths that are not faulty to obtain the reconfigured total data volume of the data unit, where one bit of the data volume of the data unit is transmitted over one of the full-bandwidth transmission paths each time.

With reference to the fourth possible implementation manner of the second aspect, in a fifth possible implementation manner of the second aspect, the configuring unit is configured to: round up a quotient obtained by dividing a data volume of a check code by the quantity of full-bandwidth transmission paths that are not faulty, and multiply a result obtained by rounding up the quotient by a base burst quantity in order to obtain the target burst quantity, where the base burst quantity is set according to a design standard of the bus.

It can be learned from the foregoing technical solutions that the embodiments of the present disclosure have the following advantages.

Full-bandwidth transmission paths in the embodiments of the present disclosure may include data transmission paths and redundancy check paths, where the data transmission paths are used to transmit a data unit, and the redundancy check paths are used to perform data link layer check for transmission of the data unit. When it is detected that a fault occurs in the full-bandwidth transmission paths, if a quantity of faulty full-bandwidth transmission paths is less than or equal to a quantity of redundancy check paths, a data link layer check function of the redundancy check paths may be disabled, and full-bandwidth transmission paths whose quantity is equal to a quantity of original data transmission paths are selected from full-bandwidth transmission paths that are not faulty to transmit the data unit, and if a fault occurs in the redundancy check paths, the data unit is reconfigured so that a data volume of the data unit is an integer multiple of a quantity of full-bandwidth transmission paths that are not faulty, thereby preventing bandwidth from a dramatic decrease due to adaptation to a data volume of a data link layer message unit (LUnit) such that bandwidth resources may be effectively used.

BRIEF DESCRIPTION OF DRAWINGS

To describe the technical solutions in the embodiments of the present disclosure more clearly, the following briefly introduces the accompanying drawings may need for describing the embodiments.

DESCRIPTION OF EMBODIMENTS

Figure 1:
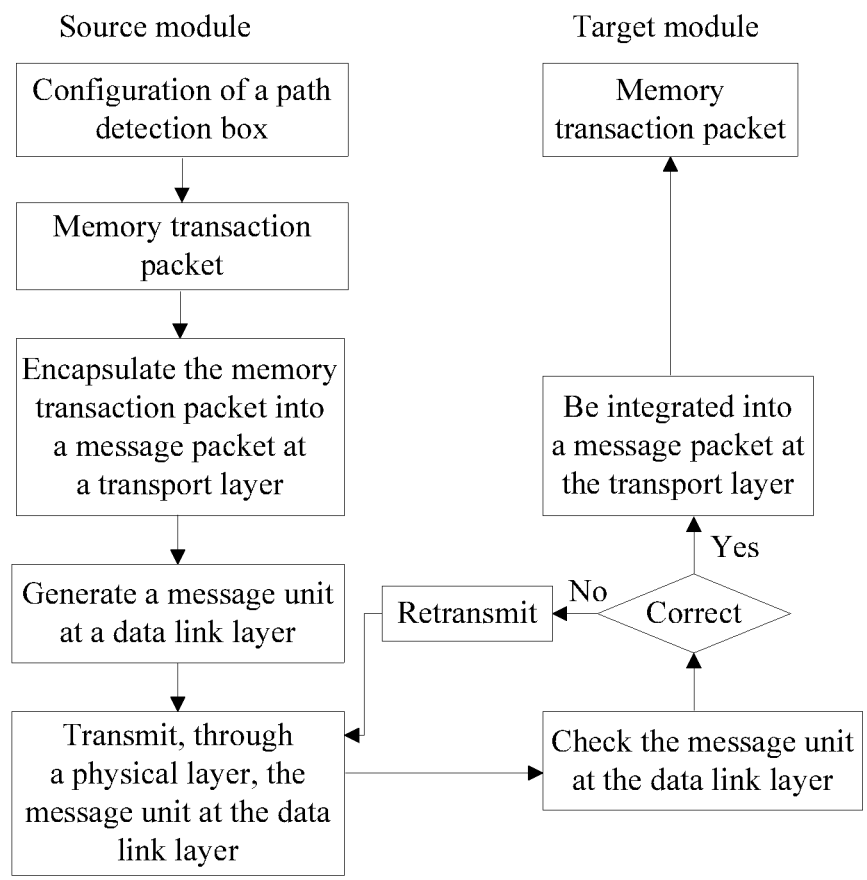
FIG. 1 is a schematic diagram of a bus architecture for data transmission according to an embodiment of the present disclosure.

Embodiments of the present disclosure provide a data transmission method, which is used to, when a full-bandwidth transmission path is faulty, adaptively adjust a data unit transmission manner according to a condition of full-bandwidth transmission paths.

The following briefly describes a system architecture applied in the data transmission method in the embodiments of the present disclosure, and describes a protocol module and a control module at a transmit end (source module), and a protocol module and a control module at a receive end (target module) respectively.

I. Protocol Module at a Transmit End

An error tolerance protocol is mainly designed according to the transmission layers (including a physical layer, a data link layer, a transport layer, and a transaction layer) in order to ensure a high-efficiency and errorless transmission process. In addition, when an error occurs in a transmission process, a self-healing capability may be needed, and normal running of a system is ensured by means of bandwidth reduction or an error tolerance capability.

The error tolerance protocol in the embodiments of the present disclosure is a protocol mainly designed in four layers, namely, the physical layer, the data link layer, the transport layer, and the transaction layer. Seen from an upper layer to a lower layer, an original packet that needs to be sent by a transmit end is a transaction layer packet and cannot be directly transmitted. The transmit end first encapsulates the packet into a transport layer packet, further segments the transport layer packet into data link layer transmission units (namely, a type of data unit in the embodiments of the present disclosure), and then transmits the transmission units through the physical layer. The receive end receives transmission data from the physical layer, after verifying that the transmission data is errorless, disassembles the transmission data to obtain data link layer transmission units, then sends the transmission units to the transaction layer to obtain a transaction layer packet, and finally sends the transaction layer packet to the receive end for processing.

II. Control Module at the Transmit End

A control module mainly monitors an available quantity of full-bandwidth transmission paths, and determines configuration information of a protocol module. A control module at the transmit end performs detection and configuration on a path.

III. Protocol Module at a Receive End

To ensure correct depacketization, a receive end needs to maintain a protocol configuration consistent with that at a transmit end. The receive end performs protocol layer configuration according to configuration information of the control module at the receive end. After the configuration is successful, a feedback is given to the control module. Further, a LUnit and check information that are received on a full-bandwidth transmission path are collected according to the configuration information. LUnits is checked. If there is no error, the LUnits are combined into a transport layer packet, and the transport layer packet is further depacketized to obtain a memory transaction packet. If an error occurs in the check, a feedback is given to the control module.

IV. Control Module at the Receive End

A control module at the receive end is mainly responsible for synchronizing with the control module at the transmit end, performs same protocol configuration by means of a handshake, and is also responsible for retransmission. If a check error signal sent by the protocol module is received, a control information packet is sent to the transmit end to notify the transmit end to perform transmission.

A bus transmission procedure for message transmission is shown in FIG. 1. After completing path detection and configuration, the source module extracts a transaction layer packet, and initiates transmission of the transaction layer packet. The transaction layer packet is first encapsulated into a transport layer packet, and the transport layer packet is further segmented into LUnits. The LUnits are sequentially transmitted to a bandwidth path at the physical layer for transmission. After transmission of one LUnit is completed, a target module performs CRC on the LUnit, and if an error occurs, sends a special link layer control message unit to the source module for retransmission. If there is no error in the link layer control message unit, the LUnits are combined into a complete transport layer packet, the transport layer packet is depacketized to obtain a transaction layer packet, and the transaction layer packet is sent to a subsequent processing part. This is a basic procedure of transmission and check of a data unit.

Figure 2:
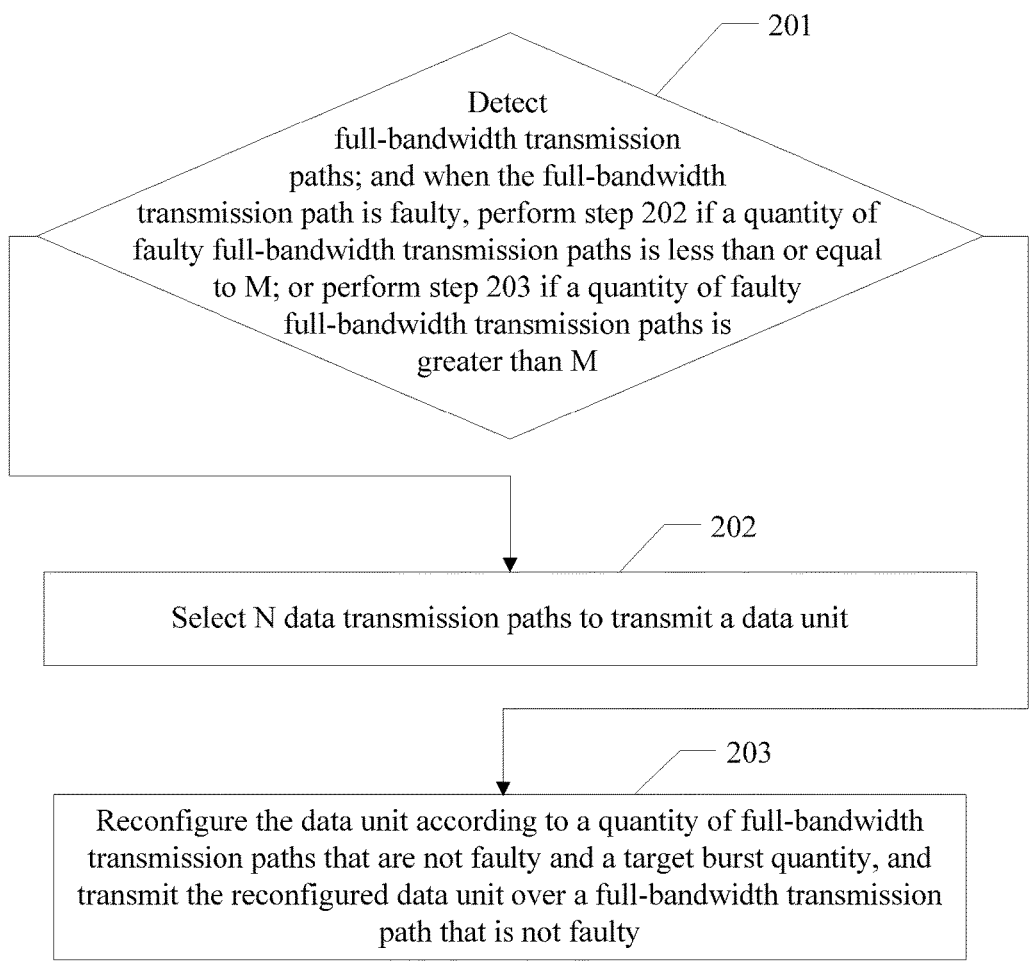
FIG. 2 is a schematic flowchart of a data transmission method according to an embodiment of the present disclosure.

Referring to FIG. 2, an embodiment of a data transmission method in the embodiments of the present disclosure includes the following steps.

Step 201: Detect full-bandwidth transmission paths, and when a fault occurs in the full-bandwidth transmission paths, perform step 202 if a quantity of faulty full-bandwidth transmission paths is less than or equal to M, or perform step 203 if a quantity of faulty full-bandwidth transmission paths is greater than M.

A data transmission apparatus detects the full-bandwidth transmission paths, where the full-bandwidth transmission paths include N data transmission paths and M redundancy check paths. The data transmission paths are used to transmit a data unit, and the redundancy check paths are used to perform data link layer check for transmission of the data unit. N and M are both natural numbers greater than 0.

If the full-bandwidth transmission paths are normal, transmission of a data unit is performed over a current full-bandwidth transmission path, and step 202 is performed if a fault occurs in the full-bandwidth transmission paths and the quantity of faulty full-bandwidth transmission paths is less than or equal to M, or step 203 is performed if a fault occurs in the full-bandwidth transmission paths and the quantity of faulty full-bandwidth transmission paths is greater than M.

Exemplarily, the full-bandwidth transmission paths may be detected using a CRC check code.

In actual application, which paths are data transmission paths and which are redundancy check paths are not explicitly specified. That is, in the full-bandwidth transmission paths, specific data transmission paths and redundancy check paths may be allocated according to information such as a total quantity of full-bandwidth transmission paths and a size of a data unit. For example, if there are 19 full-bandwidth transmission paths, and a size of one data unit is 64 bits, a most suitable quantity of data transmission paths is 16. Therefore, a quantity of data transmission paths is set to 16, and a quantity of redundancy check paths is three.

In this embodiment of the present disclosure, the data unit is a data block that has a specific data volume, and a data unit is a general conception and may be a LUnit of a transport layer packet. It may be understood that, in actual application, the data unit may alternatively be in another specific form, which is not further limited herein.

In actual application, the data transmission apparatus may be different physical apparatuses in different scenarios. For example, in a scenario in which a memory controller sends data to a memory, the data transmission apparatus is the memory controller.

Step 202: Select N data transmission paths to transmit a data unit.

If a fault occurs in the full-bandwidth transmission paths and the quantity of faulty full-bandwidth transmission paths is less than or equal to M, the data transmission apparatus selects N data transmission paths from full-bandwidth transmission paths that are not faulty to transmit the data unit, where N is equal to a quantity of original data transmission paths.

The data link layer check refers to a check performed on each data link data unit.

Transport layer check refers to a check performed on a transport layer packet.

Step 203: Reconfigure the data unit according to a quantity of full-bandwidth transmission paths that are not faulty and a target burst quantity, and transmit the reconfigured data unit over a full-bandwidth transmission path that is not faulty.

In a case in which there is no fault in the full-bandwidth transmission paths, after the data transmission apparatus encapsulates a transaction layer packet into a transport layer packet, the data transmission apparatus splits the transport layer packet into several data units. A general size of a data unit is 64 bits. If there are 16 data transmission paths, a burst quantity for transmission is four (that means, transmission needs to be performed on a data transmission path for four times to complete transmission of one data unit).

If a fault occurs in the full-bandwidth transmission paths and the quantity of faulty full-bandwidth transmission paths is greater than the quantity of redundancy check paths, it is needed to reconfigure the data unit according to a quantity of full-bandwidth transmission paths that are not faulty and a target burst quantity such that the data volume of the data unit is an integer multiple of the quantity of full-bandwidth transmission paths that are not faulty, where the target burst quantity is a quantity of transmission times over the full-bandwidth transmission paths for completing transmission of one data unit. After reconfiguration of the data unit is completed, the reconfigured data unit is transmitted over a full-bandwidth transmission path that is not faulty.

Furthermore, the target burst quantity is a sum of a data burst quantity and a check code burst quantity, the check code burst quantity is a quantity of transmission times over the full-bandwidth transmission paths for completing transmission of a check code corresponding to one data unit, and the data burst quantity is a quantity of transmission times over the full-bandwidth transmission paths for completing transmission of data corresponding to one data unit.

When a size of the data unit is reconfigured, a check code may also be transmitted in the last one burst or the last two bursts of transmission of a data unit. Considering the size of the data unit, to ensure redundancy of data check, a size of the check code may be set to 12 bits.

Optionally, the target burst quantity may be set according to an actual situation. If the target burst quantity is set to 6, when there are 12 full-bandwidth transmission paths that are not faulty, the first five bursts are used to transmit data (a data volume of a data portion of a data unit is 60), and the last burst is used to transmit the check code. In this case, the size of the data unit may be set to 72 bits.

Figure 3:
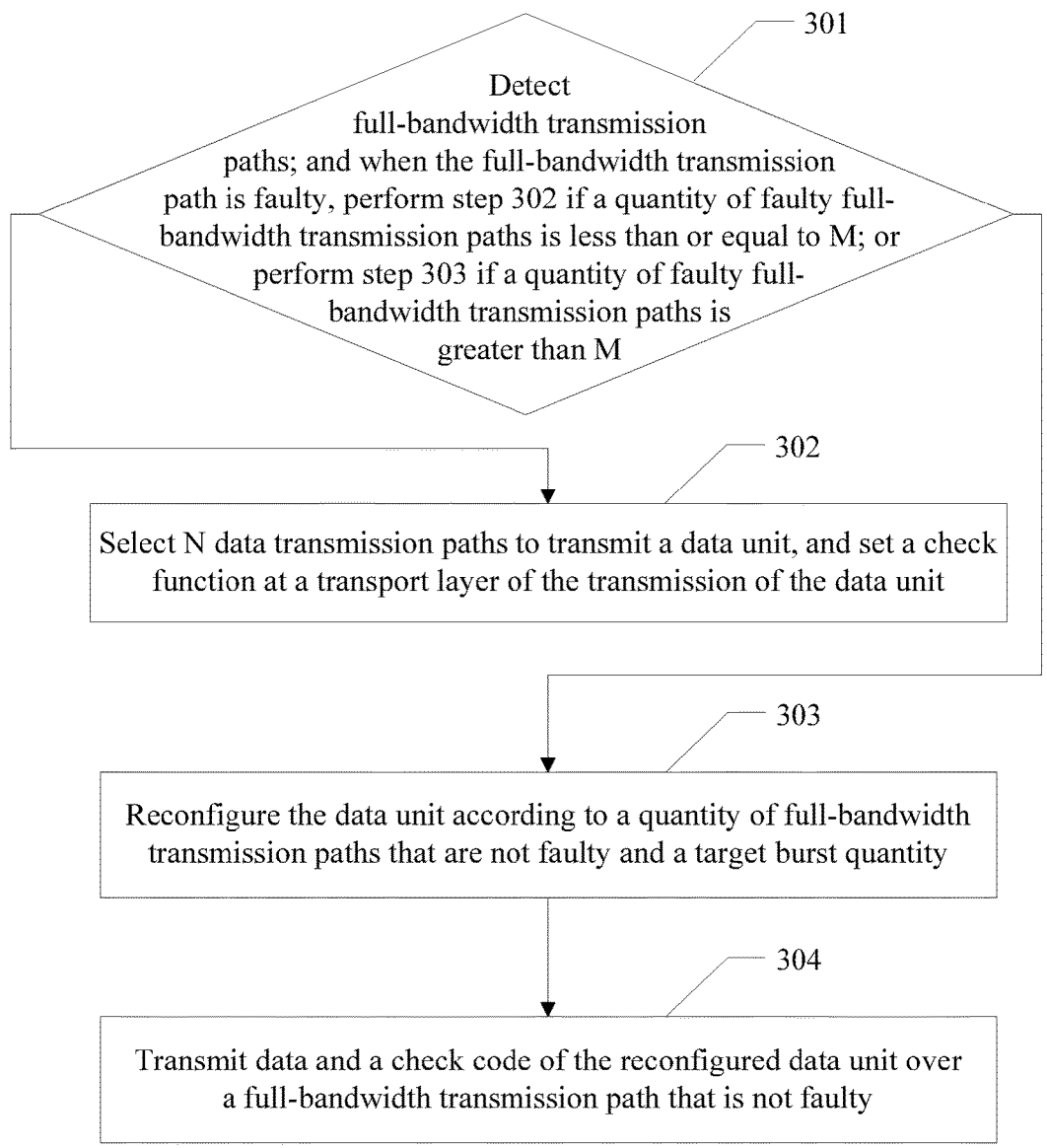
FIG. 3 is another schematic flowchart of a data transmission method according to an embodiment of the present disclosure.

The following describes implementation of the foregoing data transmission method in detail. Referring to FIG. 3, another embodiment of the data transmission method in the embodiments of the present disclosure includes the following steps.

Step 301: Detect full-bandwidth transmission paths, and when a fault occurs in the full-bandwidth transmission paths, perform step 302 if a quantity of faulty full-bandwidth transmission paths is less than or equal to M, or perform step 303 if a quantity of faulty full-bandwidth transmission paths is greater than M.

A data transmission apparatus detects the full-bandwidth transmission paths, where the full-bandwidth transmission paths include N data transmission paths and M redundancy check paths. The data transmission paths are used to transmit a data unit, and the redundancy check paths are used to perform data link layer check for transmission of the data unit. N and M are both natural numbers greater than 0.

If the full-bandwidth transmission paths are normal, transmission of a data unit is performed over a current full-bandwidth transmission path, and step 302 is performed if a fault occurs in the full-bandwidth transmission paths and the quantity of faulty full-bandwidth transmission paths is less than or equal to M, or step 303 is performed if a fault occurs in the full-bandwidth transmission paths and the quantity of faulty full-bandwidth transmission paths is greater than M.

Step 302: Select N data transmission paths to transmit a data unit, and set a transport layer check function for data unit transmission.

If a fault occurs in the full-bandwidth transmission paths and the quantity of faulty full-bandwidth transmission paths is less than or equal to M, the data transmission apparatus disables a data link layer check function of the redundancy check paths, and selects N data transmission paths from full-bandwidth transmission paths that are not faulty to transmit the data unit, where N is equal to a quantity of original data transmission paths.

Optionally, after the data link layer check function of the redundancy check paths is disabled, to take reliability of data unit transmission into consideration, the transport layer check function for data unit transmission may be set.

In actual application, because a function of a full-bandwidth transmission path is configurable, when a fault occurs in a full-bandwidth transmission path (the fault may occur in a data transmission path or a redundancy check path), in the case of a data transmission path fault, a redundancy check path may be used to replace the faulty data transmission path to transmit a data unit. In the case of a redundancy check path fault, a quantity of redundancy check paths decreases. No matter which type of path is faulty, the quantity of redundancy check paths decreases, and consequently the data transmission apparatus can no longer perform data link layer check in an original manner. Therefore, the original data link layer check function needs to be disabled. To take reliability of data unit transmission into consideration, the transport layer check function for data unit transmission may be set. Furthermore, when the data unit is encapsulated, a sequence number may be added to a packet of the data unit, and a CRC code flag is added to the packet of the data unit. When the quantity of faulty full-bandwidth transmission paths is less than or equal to M, the CRC code flag is set to enable.

Optionally, in actual application, if the quantity of faulty full-bandwidth transmission paths is less than M, data link layer check may also be performed in k full-bandwidth transmission paths that are not faulty using a CRC8 code, where the K full-bandwidth transmission paths that are not faulty are full-bandwidth transmission paths that are not faulty and left after the N full-bandwidth transmission paths are selected. In prior-art data link layer check, a check code that is used is a CRC12 code. In this embodiment of the present disclosure, because a quantity of full-bandwidth transmission paths that can be used for redundancy check decreases, the corresponding check code also needs to be changed to CRC8 that has a relatively low data volume. K is an integer greater than 0.

Step 303: Reconfigure the data unit according to a quantity of full-bandwidth transmission paths that are not faulty and a target burst quantity.

In a case in which there is no fault in the full-bandwidth transmission paths, after the data transmission apparatus encapsulates a transaction layer packet into a transport layer packet, the data transmission apparatus splits the transport layer packet into several data units. If a fault occurs in the full-bandwidth transmission paths and the quantity of faulty full-bandwidth transmission paths is greater than the quantity of redundancy check paths, it is needed to reconfigure the data unit according to a quantity of full-bandwidth transmission paths that are not faulty and a target burst quantity such that the data volume of the data unit is an integer multiple of the quantity of full-bandwidth transmission paths that are not faulty.

Furthermore, a total data volume of a single data unit may be reconfigured, and the target burst quantity for transmission of the reconfigured data unit is acquired. The target burst quantity and the quantity of full-bandwidth transmission paths that are not faulty are multiplied to obtain the reconfigured total data volume of the data unit, where one bit of the data volume of the data unit is transmitted over one of the full-bandwidth transmission paths each time.

Further, the target burst quantity may be obtained by rounding up a quotient obtained by dividing a data volume of a check code by the quantity of full-bandwidth transmission paths that are not faulty, and multiplying a result obtained by rounding up the quotient by a base burst quantity.

Furthermore, a computing formula of the target burst quantity may be, Target burst quantity=Base burst quantity* (Data volume of a check code/Quantity of full-bandwidth transmission paths that are not faulty).

Furthermore, a computing formula for the total data volume of the reconfigured data unit may be, Total data volume of a data unit=Target burst quantity*Quantity of full-bandwidth transmission paths that are not faulty.

The base burst quantity is set according to a design standard of a bus. In actual application, bus design standards executed by different vendors are different, and values of the base burst quantity are accordingly different. Furthermore, the base burst quantity may be 4, 8, or 10.

Step 304: Transmit data and a check code of the reconfigured data unit over a full-bandwidth transmission path that is not faulty.

The data transmission apparatus transmits the reconfigured data unit over the full-bandwidth transmission path that is not faulty, and after data transmission of the reconfigured data unit is completed, transmits the check code of the data unit over the full-bandwidth transmission path that is not faulty.

In actual application, a transport layer packet is relatively large, and a check delay is large. When the reconfigured data unit is transmitted over a full-bandwidth transmission path that is not faulty, whether an error occurs can be checked with no need to wait for completion of transmission of all transport layer packets, which has relatively high efficiency.

In actual application, a length of the check code may be set to 12 bits, and a 12-bit check code can ensure a relatively high check rate. A check rate of a 4-bit check code is extremely low, and an 8-bit, a 12-bit, or a 16-bit check code may be selected according to an actual requirement.

In this embodiment of the present disclosure, when a quantity of faulty full-bandwidth transmission paths is greater than a quantity of redundancy check paths, correct running of a transmission process of a data unit and smooth degradation of performance may be ensured by reconfiguring the data link layer packet. In addition, the feature of reconfigurability enables the data transmission apparatus to dynamically adjust bandwidth according to a power consumption demand.

For ease of understanding, the following further describes in detail, using a specific application scenario with a hardware structure in the embodiment of the present disclosure, the data transmission method described in the foregoing embodiment, which is as follows. In an initialization phase of full-bandwidth transmission paths, it is detected whether the full-bandwidth transmission paths run normally. When all paths run normally, transmission is performed over all the paths, where data is transmitted over 16 data transmission paths, and check information is transmitted over three redundancy check paths. If an error occurs in one path, one of the three redundancy check paths is used to transfer data, and a transport layer check function is enabled. When there are two faulty paths, two redundancy check paths are used to transmit data, and a transport layer error-detection option is enabled. When there are more than three paths in which hard faults occur, adaptive bandwidth transmission is performed, and a data unit is reconfigured according to a quantity of full-bandwidth transmission paths that are not faulty and a target burst quantity such that bandwidth utilization is maximized.

Figure 4:
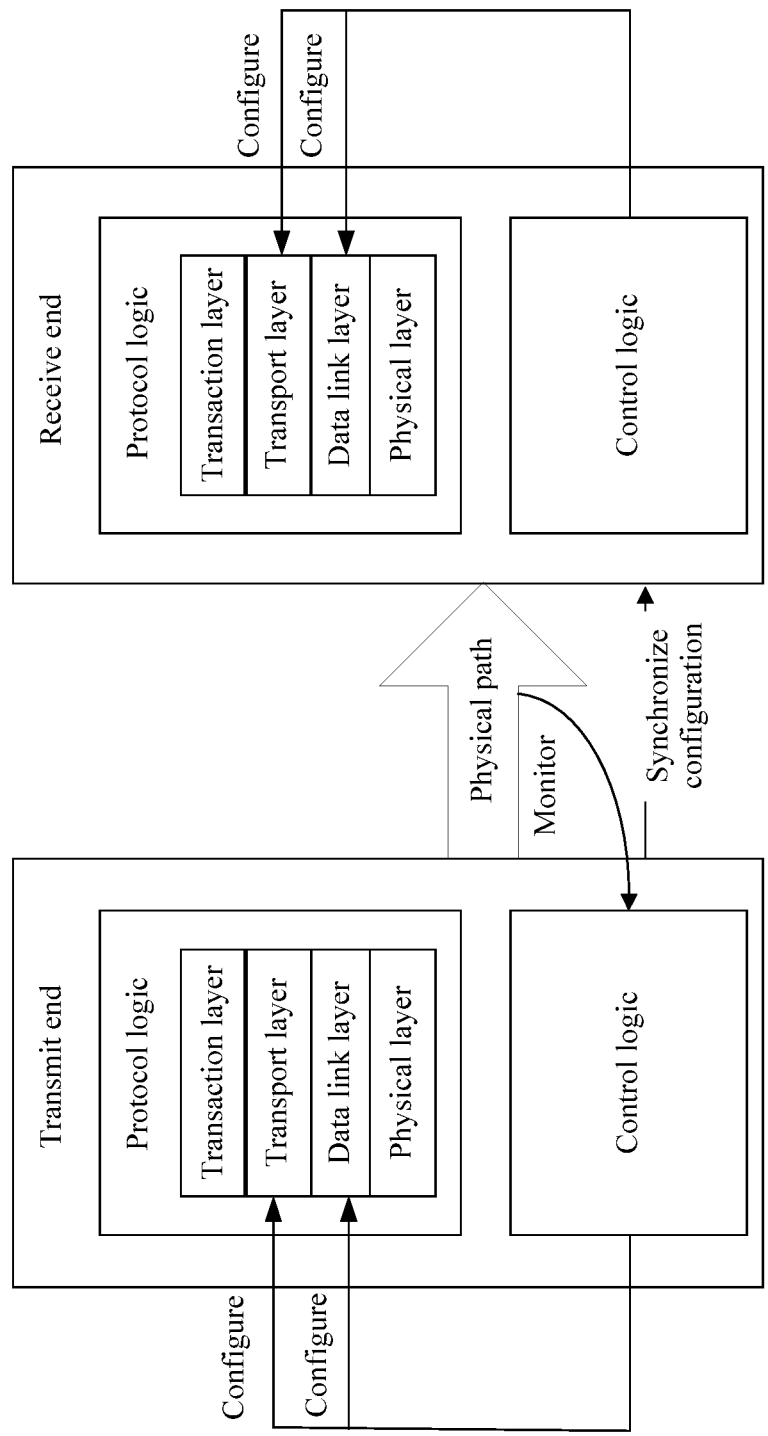
FIG. 4 is a schematic diagram of a protocol architecture and control logic of a bus according to an embodiment of the present disclosure.

Interconnection by means of a bus helps complete message transmission between a transmit end and a receive end, which needs to ensure reliable, high-speed, and highly-efficient transmission. For this reason, reliability design needs to be performed on all layers of the bus. This mainly includes a reliable protocol architecture and corresponding control logic of the bus. A design structure diagram of a bus is shown in FIG. 4. The following describes a protocol module and a control module at a transmit end (source module), and a protocol module and a control module at a receive end (target module) respectively.

I. Protocol Module at a Transmit End

An error tolerance protocol is mainly designed according to the transmission layers (including a physical layer, a data link layer, a transport layer, and a transaction layer) in order to ensure a high-efficiency and errorless transmission process. In addition, when an error occurs in a transmission process, a self-healing capability may be needed, and normal running of a system is ensured by means of bandwidth reduction or an error tolerance capability.

Figure 5:
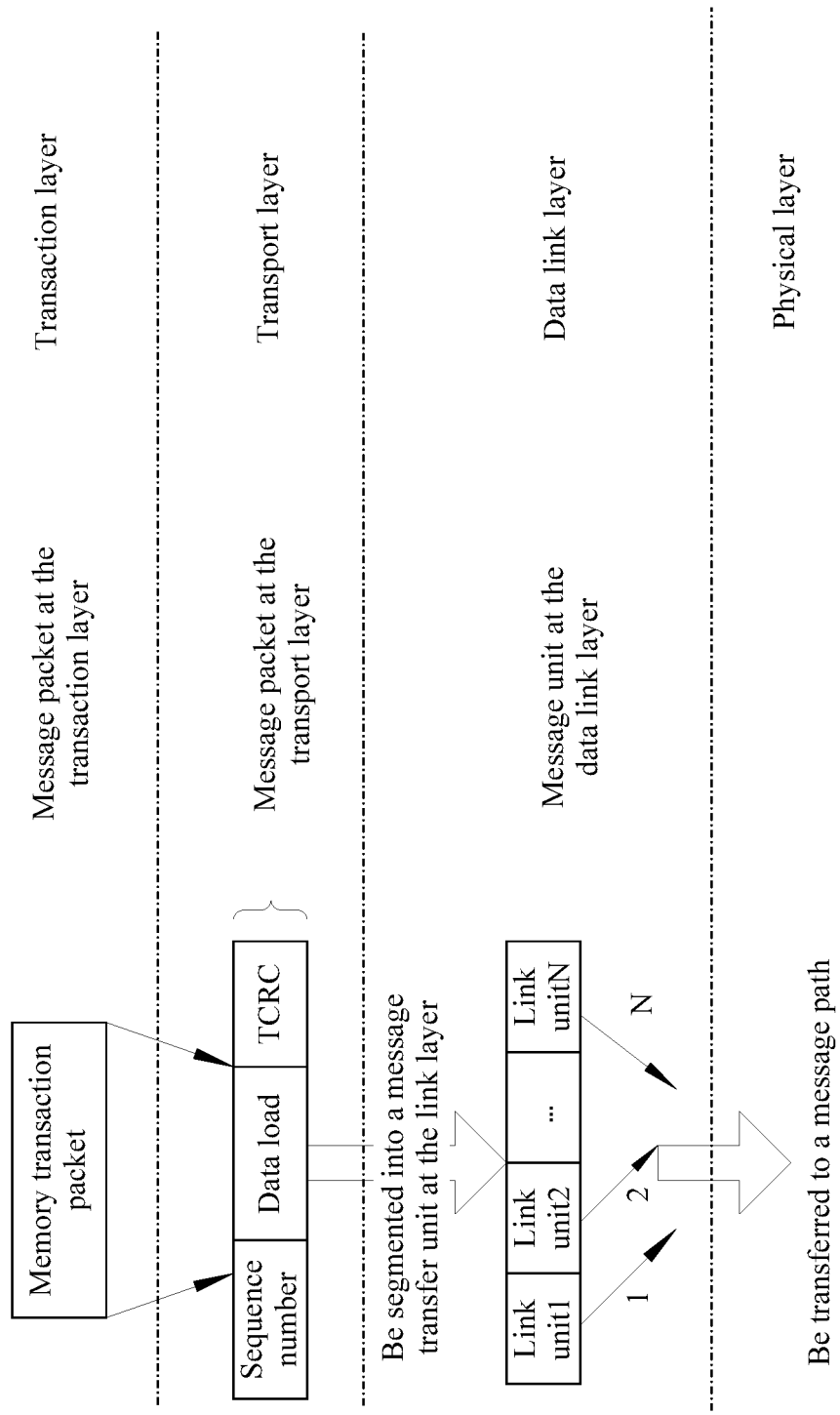
FIG. 5 is a schematic diagram of a data structure according to an embodiment of the present disclosure.

Referring to FIG. 5, the following describes in detail a physical layer, a data link layer, a transport layer, and a transaction layer separately in this embodiment of the present disclosure.

1. Physical Layer

The physical layer includes a signal cable, and a signal is transmitted between a source module and a target module using a full-bandwidth transmission path. Each path consists of two one-way connections, and the two one-way connections use a same clock. The full-bandwidth transmission paths include data transmission paths and redundancy check paths. Bandwidth of the full-bandwidth transmission paths may vary with a reliability condition of an operating environment.

2. Data Link Layer

Main tasks of the data link layer are, (1) ensuring reliable data transmission between a sending module and a receive end, and (2) abstracting the physical layer, and being capable of providing services for an upper layer. A minimum message processing unit at the data link layer is a LUnit and is obtained by segmenting a transport layer packet. A format of the LUnit is as follows. The first bit is a type bit. If the first bit is 0, the message unit is a data unit. If the first bit is 1, it indicates that the data unit is a control unit, where data bits of the control unit indicates error information.

An LUnit may be configured according to control module information. In a case in which no path is faulty, a size of the LUnit is 64 bits, and in a case of full bandwidth, one LUnit needs to be transmitted four times over the full-bandwidth transmission paths.

Reliability design at the data link layer mainly includes the following. 1. For an LUnit, a cyclic check code transmitted using a redundancy check path is used to check for an unexpected error, 2. A retransmission upon error mechanism, 3. When there are multiple faulty full-bandwidth transmission paths, normal system running and maximization of bandwidth utilization may be ensured by reconfiguring a format of the LUnit.

When a quantity of full-bandwidth transmission paths in which hard faults occur is less than a quantity of redundancy check paths, a data link layer check function is disabled, a transport layer check function is enabled, and a redundancy check path is used to transmit data. When a quantity of faulty full-bandwidth transmission paths is greater than the quantity of redundancy check paths, the system cannot maintain full-bandwidth running. In this case, to ensure smooth degradation of bandwidth of the system, it may be needed to reconfigure a format of the data link layer transmission unit.

Herein, if a check code is set to 12 bits, and a target burst quantity is set to 8 or a multiple of 8, a criterion for reconfiguring the format of the data link layer transmission unit may be as follows. When there are more than three faulty paths, there is no dedicated path for check code transmission, and the check code is transmitted by adding a check burst. When a quantity of available paths is greater than or equal to 12, transmission of check information may be completed within one burst. In this case, one check burst is added, and a quantity of data bursts is set to 7. In this case, a total data volume of the reconfigured LUnit may be a result obtained by multiplying the quantity of available paths by eight. In actual application, the quantity of available paths may not be equal to a data volume of a check code, and a data volume that is transmitted in each burst is determined by the quantity of available paths. Therefore, in actual application, a case in which the total data volume of the reconfigured LUnit is not equal to a sum of the data volume of the check code and a data volume of an LUnit may occur. For example, in a case in which the quantity of available paths is 15, the total data volume of the reconfigured LUnit is 120, the data volume of the LUnit is 105, and the data volume of the check code is 12, when the check code is transmitted in the last burst, data of only 12 bits is valid, and three spare bits are "empty". When the quantity of available paths is less than 12, two check bursts are added, and a quantity of data bursts is set to 14. In this case, a total data volume of the reconfigured LUnit may be a result obtained by multiplying the quantity of available paths by 16; data volumes of the data link layer transmission unit in various cases are shown in the following table.

| Quantity of available paths | Quantity of check bursts | Quantity of data transmission bursts | Data volume of a check code | Data volume of an LUint | Total data volume of a reconfigured LUnit |
| --- | --- | --- | --- | --- | --- |
| 15 | 1 | 7 | 12 | 105 | 120 |
| 14 | 1 | 7 | 12 | 98 | 112 |
| 13 | 1 | 7 | 12 | 91 | 104 |
| 12 | 1 | 7 | 12 | 84 | 96 |
| 11 | 2 | 14 | 12 | 154 | 176 |
| 10 | 2 | 14 | 12 | 140 | 160 |
| 9 | 2 | 14 | 12 | 126 | 144 |
| 8 | 2 | 14 | 12 | 112 | 128 |
| 7 | 2 | 14 | 12 | 98 | 112 |
| 6 | 2 | 14 | 12 | 84 | 96 |

3. Transport Layer

At the transport layer, a sequence number and a flag (optional) of a CRC code are added to a transaction layer packet. When the quantity of faulty full-bandwidth transmission paths is less than or equal to the quantity of redundancy check paths, the flag of the CRC code is marked as enable. When the quantity of faulty full-bandwidth transmission paths is greater than the quantity of redundancy check paths, the flag of the CRC code is marked as disable.

4. Transaction Layer

Transaction processing is initiated by a memory controller and a cache scheduler, and the transaction processing mainly includes a read/write access request packet, a special command request packet, a memory status query packet, and a response packet. The transaction processing is converted into bus transaction processing packets.

II. Control Module at the Transmit End

A control module mainly monitors an available quantity of full-bandwidth transmission paths, and determines configuration information of a protocol module. The control module at the transmit end performs detection and configuration on a path. A configuration process is as follows. (a) when no full-bandwidth transmission path is damaged, a normal configuration is used. A transport layer check option is disabled, the LUnit is 64 bits, and a redundancy check path is used to transfer check information. (b) when a quantity of damaged full-bandwidth transmission paths is less than the quantity of redundancy check paths, a redundancy check path is used as a data transmission path, no CRC is performed at the data link layer, and the transport layer check option is enabled. (c) when the quantity of damaged full-bandwidth transmission paths is greater than the quantity of redundancy check paths, the transport layer check option is disabled, and the format of the LUnit is reconfigured such that the format of the LUnit is adapted to a quantity of available paths at the physical layer.

III. Protocol Module at a Receive End

To ensure correct depacketization, a receive end needs to maintain a protocol configuration consistent with that at a transmit end. The receive end performs protocol layer configuration according to configuration information of the control module at the receive end. After the configuration is successful, a feedback is given to the control module. Further, a LUnit and check information that are received on a full-bandwidth transmission path are collected according to configuration information. LUnits are checked. If there is no error, the LUnits are combined into a transport layer packet, and the transport layer packet is further depacketized to obtain a memory transaction packet. If an error occurs in the check, a feedback is given to the control module.

IV. Control Module at the Receive End

A control module at the receive end is mainly responsible for synchronizing with the control module at the transmit end, performs same protocol configuration by means of a handshake, and is also responsible for retransmission. If a check error signal sent by the protocol module is received, a control information packet is sent to the transmit end to notify the transmit end to perform transmission.

The foregoing merely uses some examples to describe an application scenario of this embodiment of the present disclosure. It can be understood that, in actual application, there may be more application scenarios, which is not further limited herein.

Figure 6:
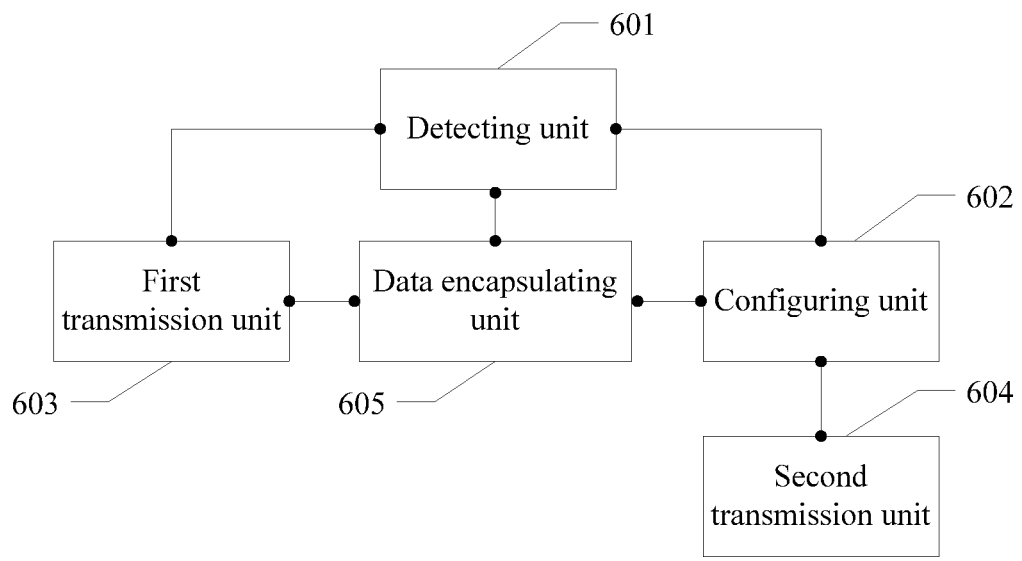
FIG. 6 is a schematic diagram of a logical structure of a data transmission apparatus according to an embodiment of the present disclosure.

The following describes a data transmission apparatus that implements the foregoing data transmission method. Referring to FIG. 6, an embodiment of the data transmission apparatus in the embodiments of the present disclosure includes a detecting unit 601, a configuring unit 602, a first transmission unit 603, and a second transmission unit 604, where the detecting unit 601 is configured to check full-bandwidth transmission paths of a bus, where the full-bandwidth transmission paths include N data transmission paths and M redundancy check paths. The data transmission paths are used to transmit a data unit, and the redundancy check paths are used to perform data link layer check for transmission of the data unit. N and M are both natural numbers greater than 0, and the data unit is a data block that has a specific data volume, and trigger the first transmission unit 603 if a fault occurs in the full-bandwidth transmission paths and a quantity of faulty full-bandwidth transmission paths is less than or equal to M, or trigger the configuring unit 602 if a fault occurs in the full-bandwidth transmission paths and a quantity of faulty full-bandwidth transmission paths is greater than M. The first transmission unit 603 is configured to select N full-bandwidth transmission paths from full-bandwidth transmission paths that are not faulty to transmit the data unit. The configuring unit 602 reconfigures a size of the data unit according to a quantity of full-bandwidth transmission paths that are not faulty and a target burst quantity such that the data volume of the data unit is an integer multiple of the quantity of full-bandwidth transmission paths that are not faulty, where the target burst quantity is a quantity of transmission times over the full-bandwidth transmission paths for completing transmission of one data unit, and after reconfiguration of the data unit is completed, triggers the second transmission unit 604. and the second transmission unit 604 is configured to transmit the reconfigured data unit over the full-bandwidth transmission paths that are not faulty.

Optionally, the first transmission unit 603 is further configured to, if a fault occurs in the full-bandwidth transmission paths and a quantity of faulty full-bandwidth transmission paths is less than or equal to M, before the selecting N full-bandwidth transmission paths from full-bandwidth transmission paths that are not faulty to transmit the data unit, disable a data link layer check function of the redundancy check paths, and set a transport layer check function for data unit transmission.

Optionally, the data transmission apparatus further includes, a data encapsulating unit 605 configured to encapsulate the data unit, add a sequence number to a packet of the data unit, and add a CRC code flag to the packet of the data unit, and when the quantity of faulty full-bandwidth transmission paths is less than or equal to M, set the CRC code flag to enable.

The first transmission unit 603 is further configured to, if a fault occurs in the full-bandwidth transmission paths and a quantity of faulty full-bandwidth transmission paths is less than M, before the selecting N full-bandwidth transmission paths from full-bandwidth transmission paths that are not faulty to transmit the data unit, change an original CRC12 code to a CRC8 code, and perform data link layer check in K full-bandwidth transmission paths that are not faulty using the CRC8 code, where the K full-bandwidth transmission paths that are not faulty are full-bandwidth transmission paths that are not faulty and left after the N full-bandwidth transmission paths are selected, and K is an integer greater than 0.

Furthermore, the configuring unit 602 is further configured to reconfigure a total data volume of a single data unit, and acquire the target burst quantity for transmission of the reconfigured data unit, where the target burst quantity is a sum of a data burst quantity and a check code burst quantity, the check code burst quantity is a quantity of transmission times over the full-bandwidth transmission paths for completing transmission of a check code corresponding to one data unit, and the data burst quantity is a quantity of transmission times over the full-bandwidth transmission paths for completing transmission of data corresponding to one data unit, and multiply the target burst quantity and the quantity of full-bandwidth transmission paths that are not faulty to obtain the reconfigured total data volume of the data unit, where one bit of the data volume of the data unit is transmitted over one of the full-bandwidth transmission paths each time.

Furthermore, the configuring unit 602 is further configured to round up a quotient obtained by dividing a data volume of a check code by the quantity of full-bandwidth transmission paths that are not faulty, and multiply a result obtained by rounding up the quotient by a base burst quantity in order to obtain the target burst quantity, where the base burst quantity is set according to a design standard of the bus.

The following describes specific operations of the units in the foregoing data transmission apparatus the detecting unit 601, the configuring unit 602, the first transmission unit 603, and the second transmission unit 604.

The detecting unit 601 detects full-bandwidth transmission paths, and when a fault occurs in the full-bandwidth transmission paths, the first transmission unit 603 is executed if a quantity of faulty full-bandwidth transmission paths is less than or equal to M, or the configuring unit 602 is executed if a quantity of faulty full-bandwidth transmission paths is greater than M.

The data transmission apparatus detects the full-bandwidth transmission paths, where the full-bandwidth transmission paths include N data transmission paths and M redundancy check paths; the data transmission paths are used to transmit a data unit, and the redundancy check paths are used to perform data link layer check for transmission of the data unit. N and M are both natural numbers greater than 0.

If the full-bandwidth transmission paths are normal, transmission of a data unit is performed over a current full-bandwidth transmission path, and the first transmission unit 603 is executed if a fault occurs in the full-bandwidth transmission paths and the quantity of faulty full-bandwidth transmission paths is less than or equal to M, or the configuring unit 602 is executed if a fault occurs in the full-bandwidth transmission paths and the quantity of faulty full-bandwidth transmission paths is greater than M.

If a fault occurs in the full-bandwidth transmission paths and the quantity of faulty full-bandwidth transmission paths is less than or equal to M, the first transmission unit 603 disables a data link layer check function of the redundancy check paths, and selects N data transmission paths from full-bandwidth transmission paths that are not faulty to transmit the data unit, where N is equal to a quantity of original data transmission paths.

Optionally, after the data link layer check function of the redundancy check paths is disabled, to take reliability of data unit transmission into consideration, the transport layer check function for data unit transmission may be set.

In actual application, because a function of a full-bandwidth transmission path is configurable, when a fault occurs in a full-bandwidth transmission path (the fault may occur in a data transmission path or a redundancy check path), in the case of a data transmission path fault, a redundancy check path may be used to replace the faulty data transmission path to transmit a data unit. In the case of a redundancy check path fault, a quantity of redundancy check paths decreases. No matter which type of path is faulty, the quantity of redundancy check paths decreases, and consequently the data transmission apparatus can no longer perform data link layer check in an original manner. Therefore, the original data link layer check function needs to be disabled. To take reliability of data unit transmission into consideration, the transport layer check function for data unit transmission may be set. Furthermore, when the data encapsulating unit 605 encapsulates the data unit, a sequence number may be added to a packet of the data unit, and a CRC code flag is added to the packet of the data unit. When the quantity of faulty full-bandwidth transmission paths is less than or equal to M, the CRC code flag is set to enable.

Optionally, in actual application, if the quantity of faulty full-bandwidth transmission paths is less than M, data link layer check may also be performed in k full-bandwidth transmission paths that are not faulty using a CRC8 code, where the K full-bandwidth transmission paths that are not faulty are full-bandwidth transmission paths that are not faulty and left after the N full-bandwidth transmission paths are selected. In prior-art data link layer check, a check code that is used is a CRC12 code. In this embodiment of the present disclosure, because a quantity of full-bandwidth transmission paths that can be used for redundancy check decreases, the corresponding check code also needs to be changed to CRC8 that has a relatively low data volume. K is an integer greater than 0.

If a fault occurs in the full-bandwidth transmission paths and the quantity of faulty full-bandwidth transmission paths is greater than the quantity of redundancy check paths, the configuring unit 602 needs to reconfigure the data unit according to a quantity of full-bandwidth transmission paths that are not faulty and a target burst quantity such that the data volume of the data unit is an integer multiple of the quantity of full-bandwidth transmission paths that are not faulty.

Furthermore, a total data volume of a single data unit may be reconfigured, and the target burst quantity for transmission of the reconfigured data unit is acquired. The target burst quantity and the quantity of full-bandwidth transmission paths that are not faulty are multiplied to obtain the reconfigured total data volume of the data unit, where one bit of the data volume of the data unit is transmitted over one of the full-bandwidth transmission paths each time.

Further, the target burst quantity may be obtained by rounding up a quotient obtained by dividing a data volume of a check code by the quantity of full-bandwidth transmission paths that are not faulty, and multiplying a result obtained by rounding up the quotient by a base burst quantity.

Furthermore, a computing formula of the target burst quantity may be, Target burst quantity=Base burst quantity* (Data volume of a check code/Quantity of full-bandwidth transmission paths that are not faulty).

Furthermore, a computing formula of the total data volume of the reconfigured data unit may be, Total data volume of a data unit=Target burst quantity*Quantity of full-bandwidth transmission paths that are not faulty.

The base burst quantity is set according to a design standard of the bus; in actual application, bus design standards executed by different vendors are different, and values of the base burst quantity are accordingly different. Furthermore, the base burst quantity may be 4, 8, or 10.

After reconfiguration of the data unit is completed, the second transmission unit 604 transmits the reconfigured data unit over a full-bandwidth transmission path that is not faulty, and after data transmission of the reconfigured data unit is completed, transmits a check code of the data unit over the full-bandwidth transmission path that is not faulty. In actual application, a transport layer packet is relatively large, and a check delay is large. When the reconfigured data unit is transmitted over the full-bandwidth transmission path that is not faulty, whether an error occurs can be checked with no need to wait for completion of transmission of all transport layer packets, which has relatively high efficiency.

An embodiment of the present disclosure further provides a computer storage medium. The computer storage medium may store a program. When being executed, the program includes all or a part of the steps of the data transmission method as described in the foregoing method embodiments.

Figure 7:
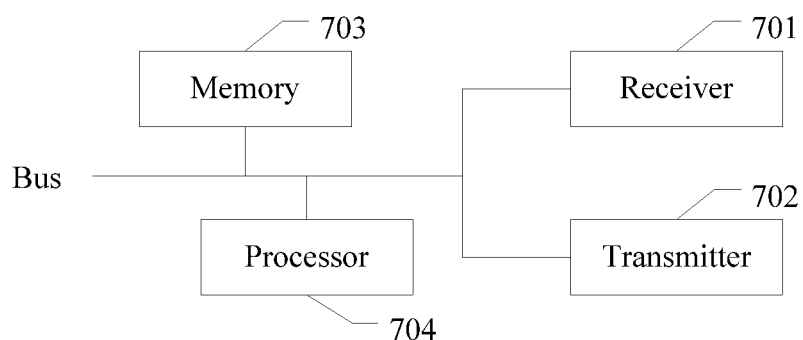
FIG. 7 is a schematic structural diagram of a computer device based on a data transmission method according to an embodiment of the present disclosure.

Referring to FIG. 7, an embodiment of the present disclosure further provides a data transmission apparatus, which may include a receiver 701, a transmitter 702, a memory 703, and a processor 704 (a quantity of processors in the data transmission apparatus may be one or more, and one processor is used as an example in FIG. 7). In some embodiments of the present disclosure, the receiver 701, the transmitter 702, the memory 703, and the processor 704 may be connected to each other by means of a bus or in another manner, and that a connection is implemented using a bus is used as an example in FIG. 7.

The processor 704 is configured to detect full-bandwidth transmission paths of a bus, and if a fault occurs in the full-bandwidth transmission paths and a quantity of faulty full-bandwidth transmission paths is less than or equal to M, instruct the transmitter 702 to select N full-bandwidth transmission paths from full-bandwidth transmission paths that are not faulty to transmit a data unit, or if a fault occurs in the full-bandwidth transmission paths and a quantity of faulty full-bandwidth transmission paths is greater than M, reconfigure a size of the data unit according to a quantity of full-bandwidth transmission paths that are not faulty and a target burst quantity such that the data volume of the data unit is an integer multiple of the quantity of full-bandwidth transmission paths that are not faulty, where the target burst quantity is a quantity of transmission times over the full-bandwidth transmission paths for completing transmission of one data unit, and after reconfiguration of the data unit is completed, instruct the transmitter 702 to transmit the reconfigured data unit over the full-bandwidth transmission paths that are not faulty.

The receiver 701 is configured to receive a data unit that needs to be transmitted.

The memory 703 is configured to store a reconfiguration algorithm of the data unit, which is acquiring the target burst quantity for transmission of the reconfigured data unit, and multiplying the target burst quantity and the quantity of full-bandwidth transmission paths that are not faulty to obtain the reconfigured total data volume of the data unit, where one bit of the data volume of the data unit is transmitted over one of the full-bandwidth transmission paths each time.

Further, the target burst quantity may be obtained by rounding up a quotient obtained by dividing a data volume of a check code by the quantity of full-bandwidth transmission paths that are not faulty, and multiplying a result obtained by rounding up the quotient by a base burst quantity.

Furthermore, a computing formula of the target burst quantity may be, Target burst quantity=Base burst quantity* (Data volume of a check code/Quantity of full-bandwidth transmission paths that are not faulty).

Furthermore, a computing formula of the total data volume of the reconfigured data unit may be, Total data volume of a data unit=Target burst quantity*Quantity of full-bandwidth transmission paths that are not faulty.

For a specific operation process of units and modules of the data transmission apparatus in this embodiment of the present disclosure, reference may be made to the foregoing embodiment, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
    detecting a fault occurs in transmission paths of a bus, wherein the transmission paths comprise N data transmission paths and M redundancy check paths, wherein the N data transmission paths are used to transmit a data unit, and the M redundancy check paths are used to perform data link layer check for transmission of the data unit, wherein N and M are both natural numbers greater than 0, and wherein the data unit is a data block with a specific data volume;
    when a quantity of faulty transmission paths is less than or equal to M:

disabling a data link layer check function of the M redundancy check paths;
enabling a transport layer check function for the data unit transmission; and
selecting, after disabling the data link layer check function and enabling the transport layer check function, N transmission paths from the transmission paths that are not faulty to transmit the data unit; and
reconfiguring the data volume of the data unit according to a quantity of the transmission paths that are not faulty and a target burst quantity, when the quantity of faulty transmission paths is greater than M such that the data volume of the data unit is an integer multiple of the quantity of the transmission paths that are not faulty, wherein the target burst quantity is a quantity of transmission times over the transmission paths of the bus for completing transmission of one data unit.

2. The method according to claim 1, wherein enabling the transport layer check function for data unit transmission comprises:
encapsulating the data unit into a plurality of packets;
adding a sequence number to each packet of the data unit;
adding a cyclic redundancy check (CRC) code flag to each packet of the data unit; and
setting the CRC code flag to enable when the quantity of faulty transmission paths is less than or equal to M.

3. The method according to claim 1, wherein before selecting N transmission paths from the transmission paths that are not faulty to transmit the data unit, when the quantity of faulty transmission paths is less than or equal to M, the method further comprises:
changing an original 12-bit cyclic redundancy check (CRC12) code to an 8-bit CRC (CRC8) code; and
performing data link layer check in K transmission paths that are not faulty using the CRC8 code, wherein the K transmission paths that are not faulty are transmission paths that are not faulty and left after the N transmission paths are selected, and wherein K is an integer greater than 0.

4. The method according to claim 1, wherein reconfiguring the data volume of the data unit according to the quantity of the transmission paths that are not faulty and the target burst quantity such that the data volume of the data unit is the integer multiple of the quantity of the transmission paths that are not faulty comprises:
reconfiguring a total data volume of the data unit;
acquiring the target burst quantity for transmission of the reconfigured data unit, wherein the target burst quantity is a sum of a data burst quantity and a check code burst quantity, wherein the check code burst quantity is a quantity of transmission times over the transmission paths for completing transmission of a check code corresponding to one data unit, and wherein the data burst quantity is a quantity of transmission times over the transmission paths for completing transmission of data corresponding to one data unit; and
multiplying the target burst quantity and the quantity of the transmission paths that are not faulty to obtain the reconfigured total data volume of the data unit, wherein one bit of the data volume of the data unit is transmitted over one of the transmission paths each time.

5. The method according to claim 4, wherein acquiring the target burst quantity for transmission of the reconfigured data unit comprises:
rounding up a quotient obtained by dividing the data volume of the check code by the quantity of the transmission paths that are not faulty; and
multiplying a result obtained by rounding up the quotient by a base burst quantity in order to obtain the target burst quantity, wherein the base burst quantity is set according to a design standard of the bus.

6. A data transmission apparatus, comprising:
a receiver configured to receive a data unit that needs to be transmitted;
a transmitter configured to transmit the data unit to a receiving end;
a memory configured to store one or more fixed sequences of instructions;
a processor coupled to the receiver, the transmitter and the memory, wherein when the fixed sequences of instructions are read from the memory and executed by the processor, causes the processor to:
detect a fault occurs in transmission paths of a bus, wherein the transmission paths comprise N data transmission paths and M redundancy check paths, wherein the N data transmission paths are used to transmit a data unit, and the M redundancy check paths are used to perform data link layer check for transmission of the data unit, wherein N and M are both natural numbers greater than 0, and wherein the data unit is a data block with a specific data volume;
when a quantity of faulty transmission paths is less than or equal to M:
disable a data link layer check function of the M redundancy check paths;
enable a transport layer check function for data unit transmission; and
instruct the transmitter to select, after disabling the data link layer check function and enabling the transport layer check function, N transmission paths from transmission paths that are not faulty to transmit the data unit;
obtain a reconfigured data unit by reconfiguring the data volume of the data unit according to a quantity of transmission paths that are not faulty and a target burst quantity when the quantity of faulty transmission paths is greater than M such that the data volume of the data unit is an integer multiple of the quantity of the transmission paths that are not faulty, wherein the target burst quantity is a quantity of transmission times over the transmission paths for completing transmission of one data unit; and
instruct the transmitter to transmit the reconfigured data unit over the transmission paths of the bus that are not faulty after the reconfiguration of the data unit is completed.

7. The apparatus according to claim 6, wherein when the fixed sequences of instructions are read from the memory and executed by the processor, causes the processor to perform further the steps of:
encapsulate the data unit into a plurality of packets;
add a sequence number to each packet of the data unit;
add a cyclic redundancy check (CRC) code flag to each packet of the data unit; and
set the CRC code flag to enable when the quantity of faulty transmission paths is less than or equal to M.

8. The apparatus according to claim 6, wherein when the fixed sequences of instructions are read from the memory and executed by the processor, causes the processor to perform further the steps of:
change an original 12-bit cyclic redundancy check (CRC12) code to an 8-bit CRC (CRC8) code when the quantity of faulty transmission paths is less than M; and perform data link layer check in K transmission paths that are not faulty using the CRC8 code, wherein the K transmission paths that are not faulty are transmission paths that are not faulty and left after the N transmission paths are selected, and wherein K is an integer greater than 0.

9. The apparatus according to claim 6, wherein reconfiguring the data volume of the data unit comprises:

reconfiguring a total data volume of the data unit;

acquiring the target burst quantity for transmission of the reconfigured data unit, wherein the target burst quantity is a sum of a data burst quantity and a check code burst quantity, wherein the check code burst quantity is a quantity of transmission times over the transmission paths for completing transmission of a check code corresponding to one data unit, and wherein the data burst quantity is a quantity of transmission times over the transmission paths for completing transmission of data corresponding to one data unit; and multiplying the target burst quantity and the quantity of transmission paths that are not faulty to obtain the reconfigured total data volume of the data unit, wherein one bit of the data volume of the data unit is transmitted over one of the transmission paths each time.

10. The apparatus according to claim 9, wherein the target burst quantity for transmission of the reconfigured data unit is obtained by:

rounding up a quotient obtained by dividing a data volume of a check code by the quantity of transmission paths that are not faulty; and multiplying a result obtained by rounding up the quotient by a base burst quantity in order to obtain the target burst quantity, wherein the base burst quantity is set according to a design standard of the bus.

* * * * *

UNITED STATES PATENT AND TRADEMARK OFFICE
CERTIFICATE OF CORRECTION

PATENT NO. : 10,069,604 B2
APPLICATION NO. : 15/096393
DATED : September 4, 2018
INVENTOR(S) : Xing Hu et al.

Page 1 of 1

It is certified that error appears in the above-identified patent and that said Letters Patent is hereby corrected as shown below:

On the Title Page

Item (30), Line 1: "201310505080" should read "201310505080.1"

Item (57), Line 3: "When" should read "when"

Signed and Sealed this
Thirtieth Day of October, 2018

Andrei Iancu
*Director of the United States Patent and Trademark Office*